Figure 1:
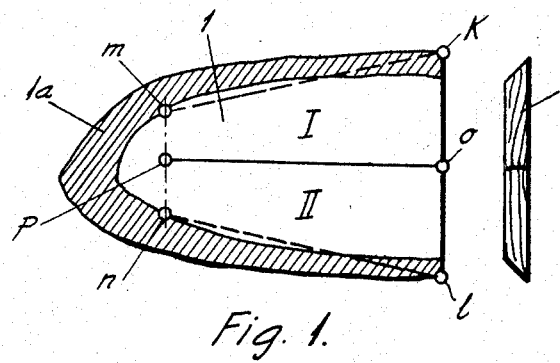

Aug. 2, 1966 J. W. ASK 3,263,722
PROCESS OF PRODUCING RECTANGULAR BOARDS FROM WANEY BOARDS
Filed Oct. 10, 1963 2 Sheets-Sheet 1

INVENTOR.
JONAS WALDEMAR ASK
BY
*Irvin S. Thompson*
ATTY.

United States Patent Office 3,263,722
Patented August 2, 1966

3,263,722
PROCESS OF PRODUCING RECTANGULAR
BOARDS FROM WANEY BOARDS
Jonas Waldemar Ask, Skogsvagen 10, Lahall, Sweden
Filed Oct. 10, 1963, Ser. No. 315,155
Claims priority, application Sweden, Oct. 19, 1962,
11,211/62
6 Claims. (Cl. 144—319)

This invention relates to a process for increasing the percentage yield in lumber conversion. Considerable effort has been put into increasing the percentage yield in lumber conversion since the percentage yield is an important factor in the economy of the industry. By using thinner saw blades, by accepting wane on the boards in order to be able to extend them in width and/or length, and sometimes by employing the technique of following the curve of crooked logs during sawing, it has proved possible to raise the yield to about 65–70% of the volume of the log. Another important factor in raising the yield to these levels has been the switch from the through-and-through sawing with one gang saw to cant sawing in two stages, usually with double gangs. The consideration underlying this latter sawing method is that the log usually has a tapered shape. Cant sawing enables better use to be made of that proportion of the volume of the log which is outside the smallest inscribed cylinder. The improved yield of cant sawing is explained in that the outer slab volume is divided into, and further converted as, four substantially identical units. In through-and-through sawing only two units make a contribution to the yield.

Assuming a straight conical log with circular cross section, full-length waneless lumber can be obtained only out of the inscribed parallelepiped whose base is the square inscribed in the top end, and out of a small number of rectangles lying outside the said square but inscribed in the top circle. Saw cuts immediately outside these rectangles will of course give surfaces with a hyberbola or parts of a hyperbola marking them off from the outside or wane surface. Taking as a basic premise the desirability of a maximal volume of waneless lumber, one can specify this as meaning that for every saw cut one must seek out that rectangle inscribed in the cut hyperbola which has the greatest area. The length and width of this rectangle will be univocally determined by the parameters of the hyperbola, i.e. by the dimensions of the log and the position of the saw cut. For one particular cut and all other cuts nearer the center of the log, the width of the rectangle will be equal to the width of the saw cut at the top end and its length will be equal to the log length. The maximum theoretical yield determined thereby will approximate closely to the figure given earlier, though it can be raised a few percent more by admitting wane. But this gain and more besides is often lost by inept handling during edging and trimming.

Another factor with an important bearing on the percentage yield is the crookedness of the log. The reduction in yield from this cause is roughly on a level with the ratio between the volume of the optimum inscribed right cone and the true volume of the log. Efforts have been made to get around this by following the crooked line in sawing, but the complications this entails and the trouble involved in bending the boards flat are often held to outweigh the gain from the increased yield.

The present invention, which concerns a process for improving the conversion yield, brings about a marked increase in the said yield and, over a wide range, eliminates the effect of log crookedness. The process is based on the ordinary through-and-through sawing technique with a gang saw, but will be of equal interest to woodworking plants, etc., which desire to make optimum use of unedged lumber. To state the theoretical background, the optimum surface area of a quadrilateral inscribed in a hyperbola is not a rectangle but a trapezium whose base coincides with the cut line of the root end. In the same way as with the rectangle, the short side and the length of the trapezium are determined by the parameters of the hyperbola, i.e. by the dimensions of the log and the position of the saw cut. It can be shown that for saw cuts well away from the center the ratio of the short side of the trapezium to its base approaches a value of 1:3, falling away to zero for a central cut. Prior to this, at a log size depending on the saw-cut distance, the short side of the trapezium becomes equal to the width of the outer saw cut at the top end. Since, moreover, a saw cut lying closer to the center will have a larger cut surface, the bottom face of an unedged board being larger than its top face, larger and usually closely coincident trapezial surfaces can be inscribed on the top and bottom faces of such a board cut nearer to the center. The sum of the top and bottom trapezial areas represents the maximum available useful board area. If this is to be retained on a rectangular board the areas must be arranged as follows: half of the bottom area plus half the top area must form one side of the board, and vice versa. This can be realized by slitting the "trapezium-optimized" board along a line running through the midpoints of the base and the short side, after which the halves are made to change places, one of them having been turned throught 180° in the plane of the saw cut. After suitable oblique and rectilinear edge dressing, which is clarified below in connection with the description of the relevant equipment, the trapezium halves can be rejoined to make a rectangular board. It will be apparent from this that, besides the yield improvement achieved by inscribing a trapezium instead of rectangular edging, there will also be the increase in the width of the board arising from the circumstance that most of the oblique wane will be incorporated as material in the final product.

The above reasoning assumes that the log is straight. In sawing a crooked log with the saw cuts parallel to the plane of the bend, which is normal practice in headsawing, the center line of the above-mentioned hyperbola will be bent in an $x$–$y$ graph. If this bend, for example, corresponds to a circular arc, it means that the positive and negative values of $y$ of the hyperbola for a given value of $x$ will be displaced by equal amounts in the same direction, equal to the distance of the arc from the $x$-axis at this value of $x$. It will be apparent from this that if the hyperbolic surface is divided into two halves by a straight line that passes through two points on the curved centerline, and if one half, the length of which is made equal to the distance between these points of intersection, is then turned through 180° and placed in the manner described above beside the other half, the sum of the partial widths will be constant irrespective of the radius of curvature. The edge dressing will thus be curved in this case, and not rectilinear.

Even if the bend in the log deviates from the circular arc assumed above, a considerable degree of such asymmetry can be tolerated, since there will of course be an excess volume, between the oblique sides of the trapezium and the edge bounded by the hyperbola, which before joining is removed during the said edge dressing. Further, this volume will be greater, relatively speaking, with saw cuts located closer to the periphery, thus compensating more easily for the irregularities in board outline which occur there. The oblique edge dressing should preferably follow a curve such that the elimination of material from the two halves of the board at any one moment will be equal.

Figure 2:
Figure 3:
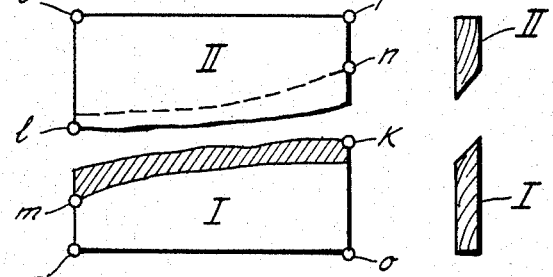
Figure 4:
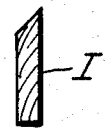
Figure 5:
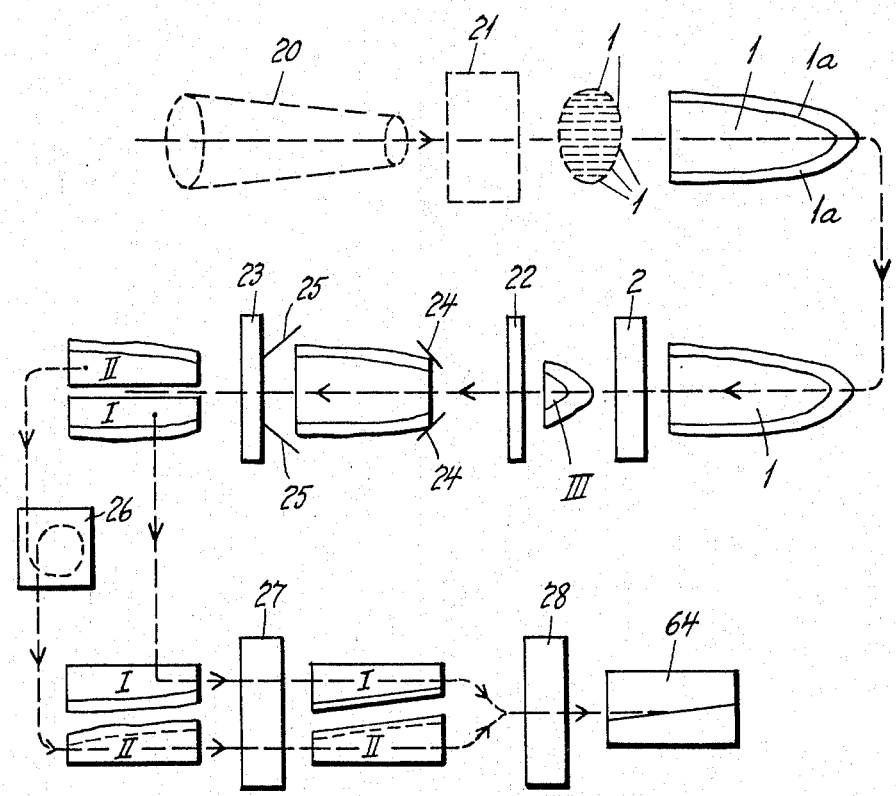
Figure 6:
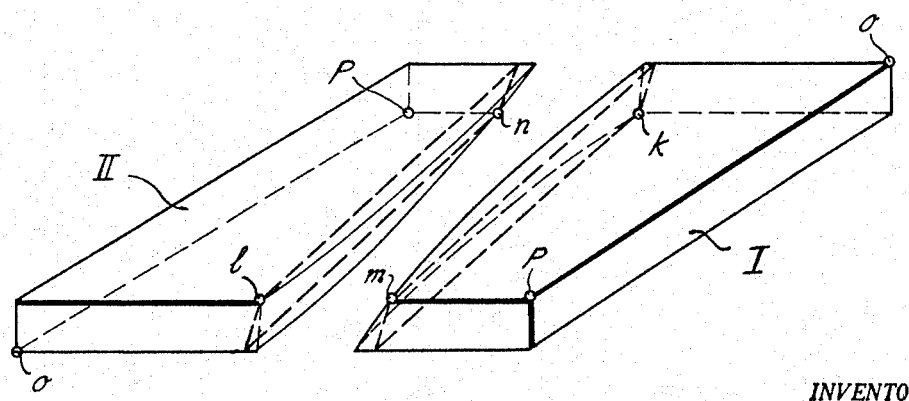

The invention is more fully explained in the following, with due reference to the appended drawing. FIG. 1 is a plan view of a board sawn from a log, the upper and lower faces of the board being bounded by hyperbola-like curves. FIG. 2 shows the cross section of the board at the root end. FIG. 3 is a plan view of the two halves of the slit board after being placed next to each other in the manner proposed according to the invention but before being edge-dressed and joined. FIG. 4 shows the cross sections of the two board halves at the right-hand end in FIG. 3. FIG. 5 is a diagram showing the various steps of the procedure proposed by the invention to obtain a waneless board having the greatest possible area from a waney board. FIG. 6 is a perspective view of two board halves intended for joining, but not yet edge-dressed.

Against this background, and with due reference to the figures, the practical procedure and equipment suited thereto will now be described more fully. In FIG. 1, the four points $k$, $l$, $m$ and $n$ are indicated on board 1 with its wane 1$a$. These points mark the corners of the maximal trapezium. This trapezium is divided into two parts or halves I and II along a line $o$–$p$ through the midpoints of the parallel sides $k$–$l$ and $m$–$n$ (or along a line parallel thereto), after which half II is turned through 180° about an axis parallel to $n$–$p$ or $l$–$o$ and changes places with half I. After appropriate working, points $k$ and $m$ should coincide with points $n$ and $l$ respectively.

FIG. 5 illustrates diagrammatically the various steps that are necessary in starting with a log and arriving at square-edged boards, making maximum use of the log volume.

A log 20 is passed through a gang saw 21, which cuts it up into a number of boards 1. These boards are passed through an apparatus 2 of the kind shown in FIGS. 5 and 6 for determination of the board length $x$ that corresponds to the maximum trapezial area. In a crosscut saw 22 the boards are cut to this length $x$. The top piece III becomes an offcut. Board 1 is then passed through a ripsaw 23 which slits it into two halves I and II along the line $o$–$p$ (FIG. 1). The board can be introduced into the ripsaw by, for example, a feed device 24, consisting of a pair of angle-set rails and bearing against the top end of the board, and at the ripsaw 23, there can be a corresponding centering arrangement 25 for the root end of the board, the latter arrangement consisting for example of a pair of angle-set resilient rails which guide the root end, the leading end, in such a way that the saw blade bites into the board at the middle of the root end (point $o$ in FIG. 1). One of the two board halves I and II which are thus produced, say II, must be turned through 180° in the plane of the saw cut in a manner described more fully in connection with FIGS. 1–4, and made to change places with the other half—I in this case. This is effected at a turning station 26 after which the two board halves in their new relative positions are taken to an edge-dressing station 27, in which the two wanes on the board halves (see also FIG. 3), which are now facing each other, are worked so that the halves can be put together to form a waneless and square-edged board. A fuller description of a suitable edge-dressing arrangement is given below.

From the edge-dressing arrangement the worked board halves I and II are taken to a gluing station 28 where they are joined together to form the final board with a width of ½($B+b$) and a length of $x_{opt}$.

For clarification of the function of the edge-dressing station 27, reference should first be made to FIG. 6, in which the board halves I and II are shown in perspective, it having been assumed for the sake of simplicity that they have been sawn from a straight conical log. The points $k$, $l$, $m$ and $n$ indicated in FIG. 1 for the maximum trapezial area reappear in FIG. 6 with the point combinations $l$–$m$ and $k$–$n$ in the top and bottom planes respectively. Since these four points must all lie in the same plane eventually, the process of edge-dressing must produce two parallel surfaces through the points $l$ and $n$ and the points $m$ and $k$ respectively. It will readily be realized that the angle of the common plane is not critical, but a suitable choice is the geometric mean between the two edge angles at the top and root ends.

Situated next to the edge-dressing station, as shown in FIG. 5, is a gluing station 28 in which the dressed board halves I and II are put together to form the finished board 64. Any detailed account of the design of the gluing station would be outside the scope of the present invention. This would appear to be an obvious case for the use of the continuous gluing presses that have recently been developed. High-frequency gluing, with the right choice of glue and application procedure, guarantees glued joints whose strength exceeds that of the wood itself.

To sum up, the following principal features and peculiarities of the invention may be pointed out. In the sawing of straight logs it provides for an improvement of the order of 25% in the volume yield as compared with the former cant-sawing procedure. The main characteristics of the process are the division of the board produced by through-and-through sawing along a center-line or a line parallel thereto and the joining of the two parts by gluing after one of them has been turned through 180° in the plane of the cut and has changed places with the other. Oblique or possibly square dressing of the wanes is assumed as an intermediate stage. Provided that the through-and-through saw cut is made along the plane of the bend, crookedness in the log need not, within very wide limits, affect the volume yield, whereas volume losses of 10 percent and more are stated to be normal and unavoidable with the methods so far in use. A not unimportant characteristic of the process described emerges in a comparison of the yield of square-edged boards as a function of varying log diameter with the corresponding yield from conventional cant sawing. In the former case the yield curves are markedly higher, besides which they are also a good deal flatter, particularly towards smaller log diameters. This means in practice that the number of size brackets in the lumber assortment can be substantially reduced, which in turn reduces the amount of reganging that is needed. On the machine side the new process calls for the addition of an arrangement for determining the maximal trapezial area, with a crosscut saw belonging thereto and replacing the trimmer located after the edger, and also a ripsaw with one blade instead of the normal edger with two blades, and finally an edge-dressing mill and a gluing installation. Ahead of the process line, if it is located in a sawmill, the gang resaw is eliminated. As for quality, one can as mentioned above expect an improvement in any warping and edge crookedness in the final product, since stresses inherent in the material change their sign as between the two board halves after the 180° turn in the plane of the cut. Also observed is a reduction of knot cross sections and the general incidence of knots in the outer edges of the boards, which from the strength point of view raises the class of the lumber. The reason for the latter point is that the outer contours are taken from the more centrally cited parts of the log (the rip cut). The pattern of the grain on the flat faces is probably the only material difference between this and a conventional board. The central regions of the board will have a close grain that is parallel in both halves, while the outer edges will display half each of the hyperbola tops that occur in the center of an undivided board. From the point of view of appearance there seems to be nothing to choose between walls put together from one or other of these types of board, since in a board made according to the invention the hyperbolic outer parts will blend in naturally with similar parts of the adjacent boards.

What I claim is:

1. A process for producing a rectangular board from a through-and-through sawed waney board having a flat root base, a lower surface of hyperbolic area, an upper surface of hyperbolic area less than said lower surface, an offcut top end, and two waney sides, said process comprising:

cutting a said waney board to a maximum trapezial area inscribed on said upper and lower surfaces with removal of the offcut top end;

dividing said waney board into two parts along a line perpendicular to said flat root base;

revolving one of said parts 180° about an axis parallel to said flat root base;

removing the wanes of said waney sides to form mating surfaces;

placing the divided parts with said mating surfaces in abutting relationship;

and joining the two parts to form a rectangular board.

2. A process for producing a rectangular board from a through-and-through sawed waney board having a flat root base, a lower surface of hyperbolic area, an upper surface of hyperbolic area less than said lower surface, and two waney sides, said process comprising:

inscribing a trapezium of maximum area on one of said lower and upper surfaces of hyperbolic area;

cutting said waney board along the line of the trapezium opposite said flat root base;

dividing said waney board into two parts along a line perpendicular to said flat root base;

revolving one of said parts 180° about an axis parallel to said flat root base;

removing the wanes of said waney sides to form mating surfaces;

placing the divided parts with the mating surfaces in abutting relationship;

and joining the two parts to form a rectangular board.

3. A process for producing a rectangular board from a through-and-through sawed waney board having a flat root base, a lower surface of hyperbolic area, an upper surface of hyperbolic area less than said lower surface, and two waney sides, said process comprising:

inscribing a trapezium of maximum area with two parallel bases in a said waney board with the first of said parallel bases positioned at said flat root base on said lower surface and the second of said parallel bases positioned opposite said flat root base on said upper surface;

cutting said waney board along the line of said trapezium base opposite said flat root base;

dividing said waney board into two parts along a line perpendicular to said flat root base;

revolving one of said parts 180° about an axis parallel to said flat root base;

removing the wanes of said waney sides to form mating surfaces;

placing the divided parts with the mating surfaces in abutting relationship;

and joining the two parts to form a rectangular board.

4. A process as defined in claim 3 wherein the mating surfaces, formed by said step of removing the wanes of said waney sides, are normal to the plane of said waney boards.

5. A process as defined in claim 3 wherein the mating surfaces, formed by said step of removing the wanes of said waney sides, are inclined to the plane of said waney boards at an angle corresponding to the mean inclination of said waney sides.

6. A process as defined in claim 3 wherein the wanes of said waney sides are removed at the same time from said parts.

References Cited by the Examiner

UNITED STATES PATENTS

| | | | |
|---|---|---|---|
| 451,834 | 5/1891 | March | 144—312 |
| 781,376 | 1/1905 | Sorenson | 144—312 |
| 1,252,445 | 1/1918 | Johansson | 144—312 |

HAROLD D. WHITEHEAD, *Primary Examiner.*

WILLIAM W. DYER, JR., *Examiner.*